(12) United States Patent
Shiosaka (10) Patent No.: US 11,761,249 B2
(45) Date of Patent: Sep. 19, 2023

(54) LATCH MECHANISM OF STORAGE CASE

(71) Applicant: SUZUKI MOTOR CORPORATION, Hamamatsu (JP)

(72) Inventor: Taku Shiosaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 47 days.

(21) Appl. No.: 17/213,367

(22) Filed: Mar. 26, 2021

(65) Prior Publication Data
US 2021/0301567 A1 Sep. 30, 2021

(30) Foreign Application Priority Data

Mar. 27, 2020 (JP) .................................. 2020-058060

(51) Int. Cl.
| | | |
|---|---|---|
| *E05B 63/00* | (2006.01) | |
| *E05B 65/52* | (2006.01) | |
| *E05B 1/00* | (2006.01) | |
| *E05C 1/10* | (2006.01) | |
| *E05C 1/00* | (2006.01) | |
| *B62J 9/20* | (2020.01) | |

(52) U.S. Cl.
CPC ............ *E05C 1/10* (2013.01); *E05B 63/0017* (2013.01); *E05B 65/5238* (2013.01); *E05C 1/004* (2013.01); *B62J 9/20* (2020.02)

(58) Field of Classification Search
CPC .......... E05C 1/10; E05C 1/004; E05C 19/145; E05B 63/0017; E05B 65/5238; E05B 13/002; E05B 65/52; B62J 9/20; B62J 9/30; B62J 9/24
See application file for complete search history.

(56) References Cited

U.S. PATENT DOCUMENTS

| 3,626,730 | A | | 12/1971 | Murase | |
|---|---|---|---|---|---|
| 4,574,601 | A | * | 3/1986 | Werk | E05B 37/02 70/312 |
| 4,915,913 | A | * | 4/1990 | Williams | B65D 45/24 436/1 |
| 10,434,206 | B2 | * | 10/2019 | Thomas | A61L 2/26 |

FOREIGN PATENT DOCUMENTS

| CN | 205243204 U | 5/2016 |
|---|---|---|
| DE | 2057807 A1 | 1/1972 |
| EP | 3133193 A2 | 2/1985 |
| EP | 2 586 687 A2 | 9/2012 |
| JP | 2013-95227 A | 5/2013 |

OTHER PUBLICATIONS

Office Action issued in Indian Patent Application No. 202114013243 dated Jan. 24, 2022.

* cited by examiner

*Primary Examiner* — Kristina R Fulton
*Assistant Examiner* — Thomas L Neubauer
(74) *Attorney, Agent, or Firm* — TROUTMAN PEPPER HAMILTON SANDERS LLP (57) ABSTRACT

A latch mechanism of a storage case where a case cover is openably and closably connected to a case body, the latch mechanism includes a latch arm connected to the case body and an arm receiving portion provided on the case cover. A hook is formed on a tip side of the latch arm. A locking claw is formed on a tip side of the arm receiving portion. The arm receiving portion is formed with an inclined surface that guides the hook toward a claw tip of the locking claw.

6 Claims, 10 Drawing Sheets

LATCH MECHANISM OF STORAGE CASE

CROSS-REFERENCE TO RELATED APPLICATION

This application is based on Japanese Patent Application No. 2020-058060 filed on Mar. 27, 2020, the contents of which are incorporated herein by way of reference.

FIELD OF INVENTION

The present invention relates to a latch mechanism of a storage case.

BACKGROUND

A storage case whose closed state is maintained by a so-called draw latch mechanism is known (for example, see JP-A-2013-095227). In the storage case described in JP-A-2013-095227, a case cover is openably and closably connected to a case body, and a storage space is formed by the case body and the case cover. A pair of hanging fittings are provided on a front surface of the case body, a pair of receiving fittings are provided on a front surface of the case cover, and the storage case is locked in a state in which the case cover is closed by pushing down a lock lever of the hanging fittings while the hanging fittings are hooked to the receiving fittings.

SUMMARY OF INVENTION

However, for example, if the lock operation is performed in a state in which the case cover is not completely closed, the hanging fittings may not be hooked to the receiving fittings, and the closed state may be maintained by a pressure contact between the receiving fittings and the hanging fittings. Therefore, it is necessary for the user to confirm whether the case cover is reliably hooked after the lock operation is completed.

The present invention has been made in view of the above circumstances, and an object thereof is to provide a latch mechanism of a storage case in which a case cover can be reliably hooked by an easy operation in a closed state.

A latch mechanism of a storage case according to an aspect of the present disclosure, the latch mechanism of a storage case in which a case cover is openably and closably connected to a case body, the latch mechanism of a storage case includes a latch arm connected to the case body, and an arm receiving portion provided on the case cover, in which a hook is formed on a tip side of the latch arm, a locking claw is formed on a tip side of the arm receiving portion, and the arm receiving portion is formed with an inclined surface that guides the hook toward a claw tip of the locking claw, so that the above problem is solved.

DETAILED DESCRIPTION

In a storage case of one aspect of the present invention, a case cover is openably and closably connected to a case body. A latch arm is connected to the case body, an arm receiving portion is provided on the case cover, and a latch mechanism for fixing the case cover to the case body is formed by the latch arm and the arm receiving portion. A hook is formed on a tip side of the latch arm, and a locking claw is formed on a tip side of the arm receiving portion. An inclined surface is formed on the arm receiving portion, and when the hook abuts on the inclined surface of the arm receiving portion during the lock operation of the latch arm, the hook is guided along the inclined surface to a claw tip of the locking claw of the arm receiving portion. The hook is hooked to the locking claw, and the case cover is locked with the case body closed. Accordingly, since the hook is reliably hooked to the locking claw by an easy operation, it is unnecessary for a user to confirm whether the hook is properly hooked.

Figure 1:
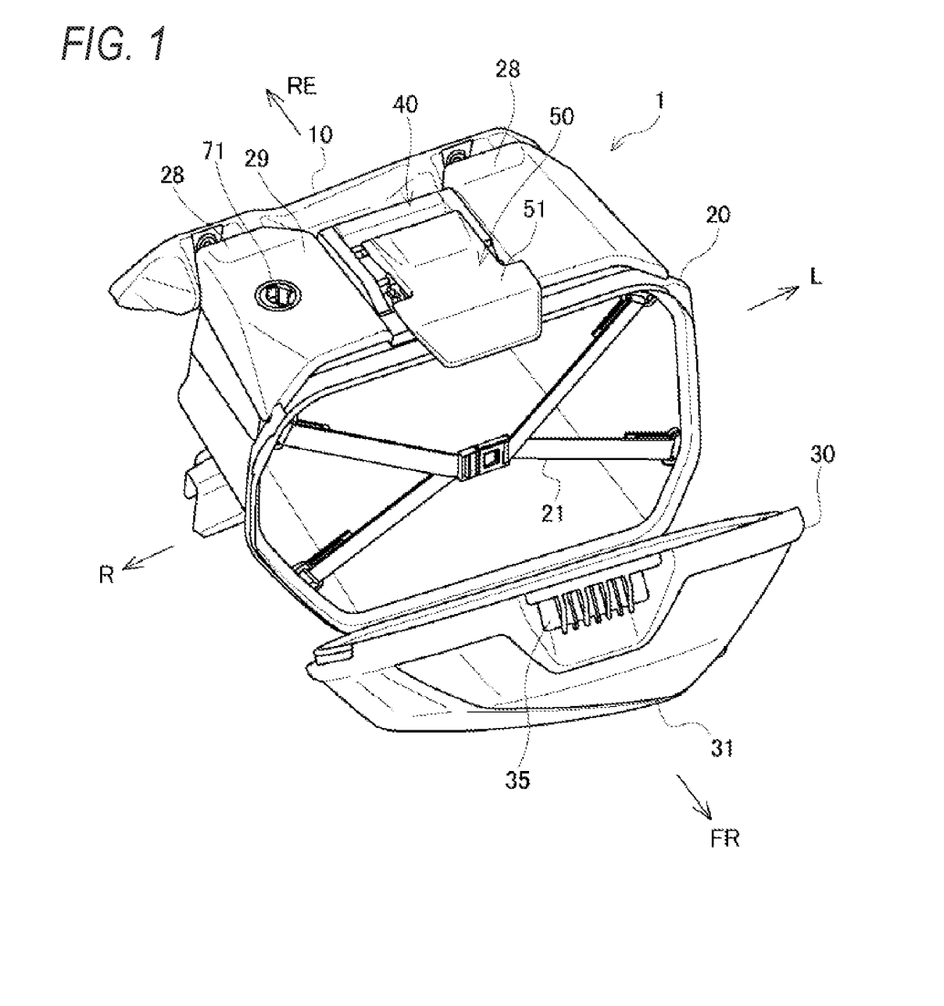
FIG. 1 is a perspective view of a storage case according to the present embodiment.

Hereinafter, the present embodiment will be described in detail with reference to the accompanying drawings. In the following description, a storage case, as a side case, that is attached to a vehicle such as a saddle-type vehicle will be described. However, the storage case of the present embodiment can be applied to other storage cases such as a rear box on a loading platform, a trunk case with casters, and a baggage bag. In the following figures, an arrow FR indicates a case front side, an arrow RE indicates a case rear side, an arrow L indicates a case left side, and an arrow R indicates a case right side. FIG. 1 is a perspective view of the storage case according to the present embodiment.

As illustrated in FIG. 1, a storage case 1 is detachably attached to a case holder 10 on a side portion of the vehicle. A front surface of a case body 20 of the storage case 1 is open, and the case cover 30 is connected to a lower edge of the case body 20 so as to be openable downward via a hinge. A baggage storage space is formed by the case body 20 and the case cover 30, and the case body 20 is provided with an X-shaped inner band 21 for holding the baggage stored in the storage space. Hemispherical elastic legs (not illustrated) are provided at four corners of a bottom surface of the storage case 1, so that the storage case 1 can stand by itself in a stable state even when the storage case 1 is removed from the vehicle.

A handle 40 that makes the storage case 1 portable is swingably connected to the center of an upper surface of the case body 20. A latch mechanism 50 for fixing the case cover 30 to the case body 20 while the case cover 30 is closed is installed inside the handle 40. Further, an upper cover 29 is attached to the upper surface of the case body 20 so as to surround the handle 40 and the latch mechanism 50. A key cylinder 71 of the locking mechanism 70 (see FIG. 6) is exposed from the upper cover 29, and the latch mechanism 50 and the handle 40 can be locked and unlocked by a key inserted into a keyhole of the key cylinder 71.

The latch mechanism 50 of the storage case 1 locks the storage case 1 in a closed state of the storage case 1 by pushing down the latch arm 51 in a state in which a tip of the latch arm 51 is hooked to the case cover 30. At this time, depending on how the latch arm 51 is pushed down, the case cover 30 may not be hooked by the latch arm 51, and the storage case 1 may be locked in an incomplete state. Therefore, in the storage case 1 of the present embodiment, the tip of the latch arm 51 in contact with the case cover 30 is guided toward a hooking position such that the case cover 30 is reliably hooked by the latch arm 51.

Figure 2:
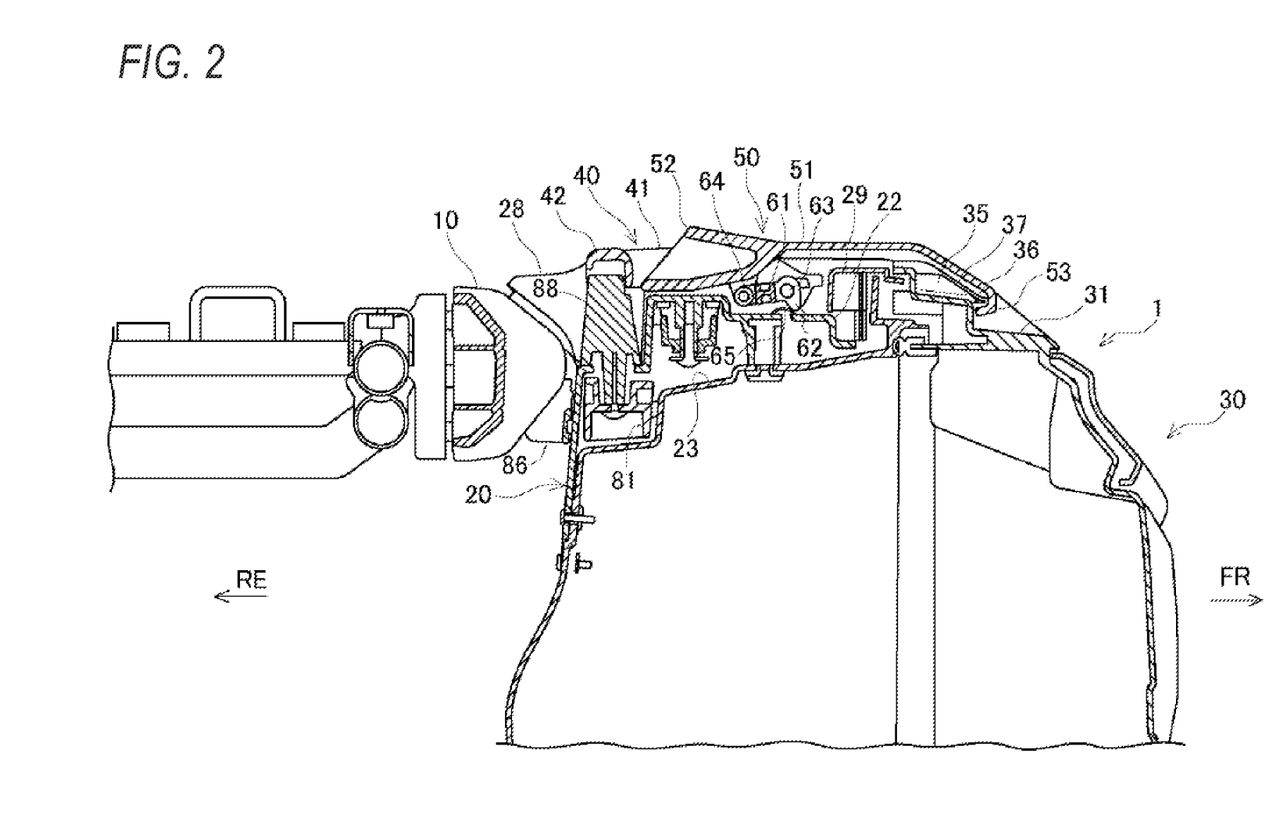
FIG. 2 is a partial cross-sectional view of the storage case according to the present embodiment.
Figure 3:
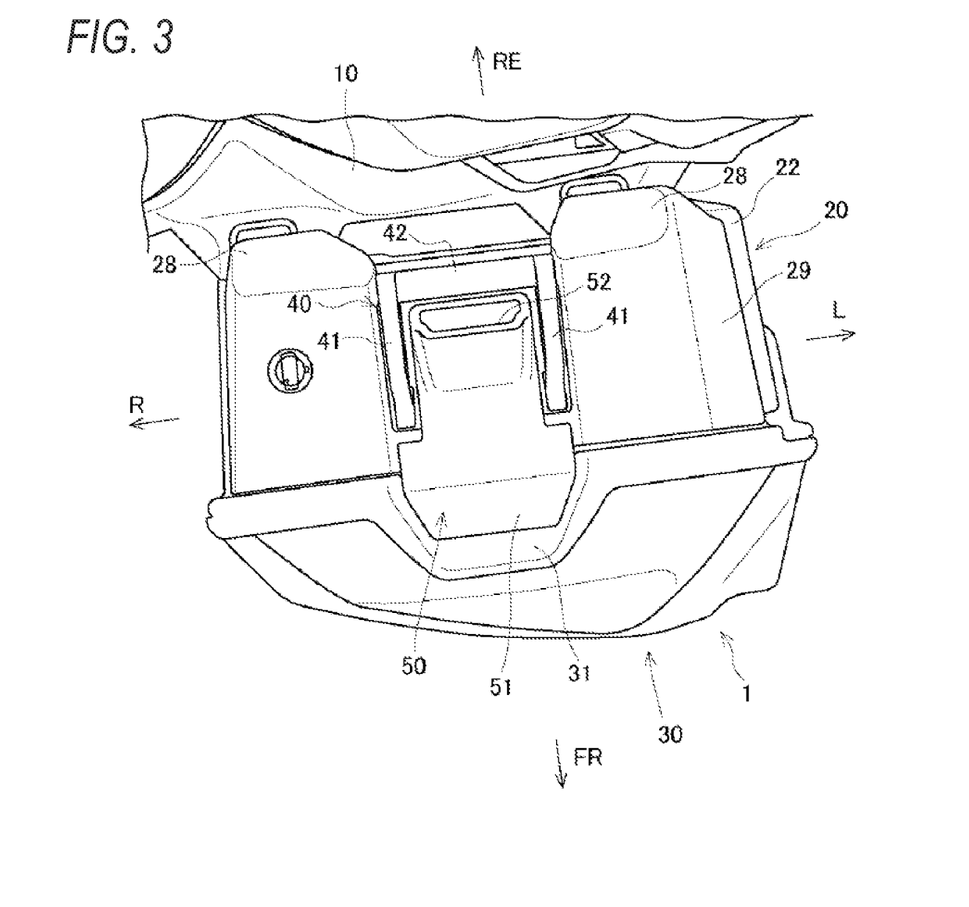
FIG. 3 is a plan view of the storage case according to the present embodiment.
Figure 4:
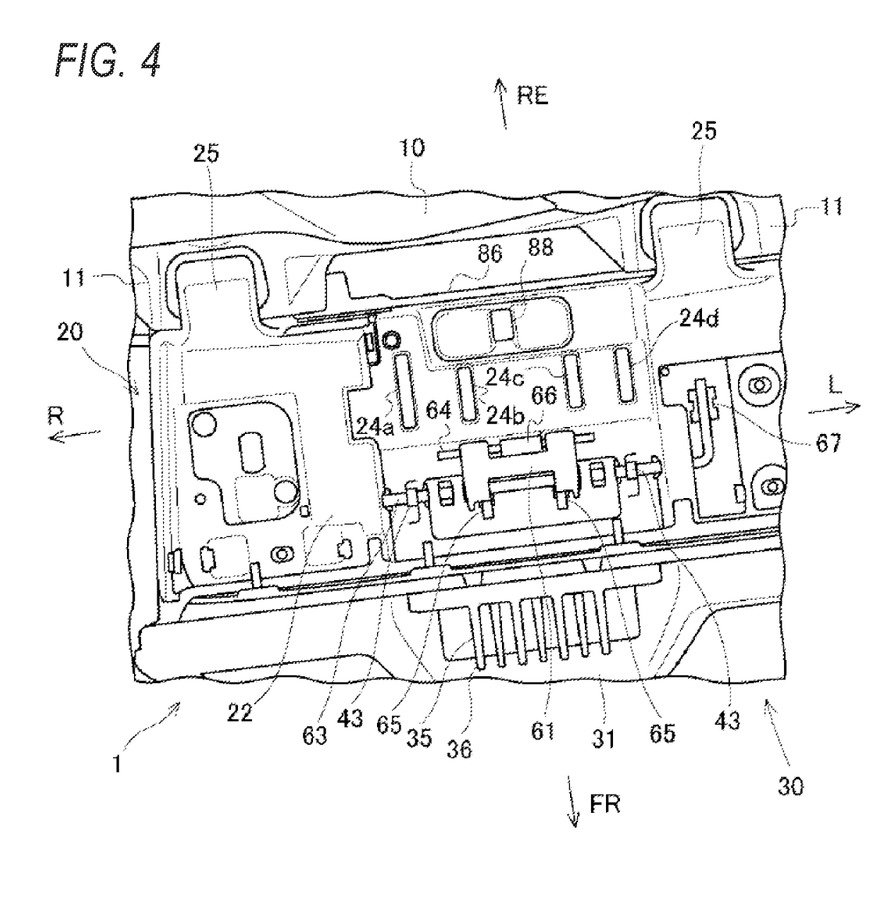
FIG. 4 is a partial plan view of the storage case according to the present embodiment.
Figure 5:
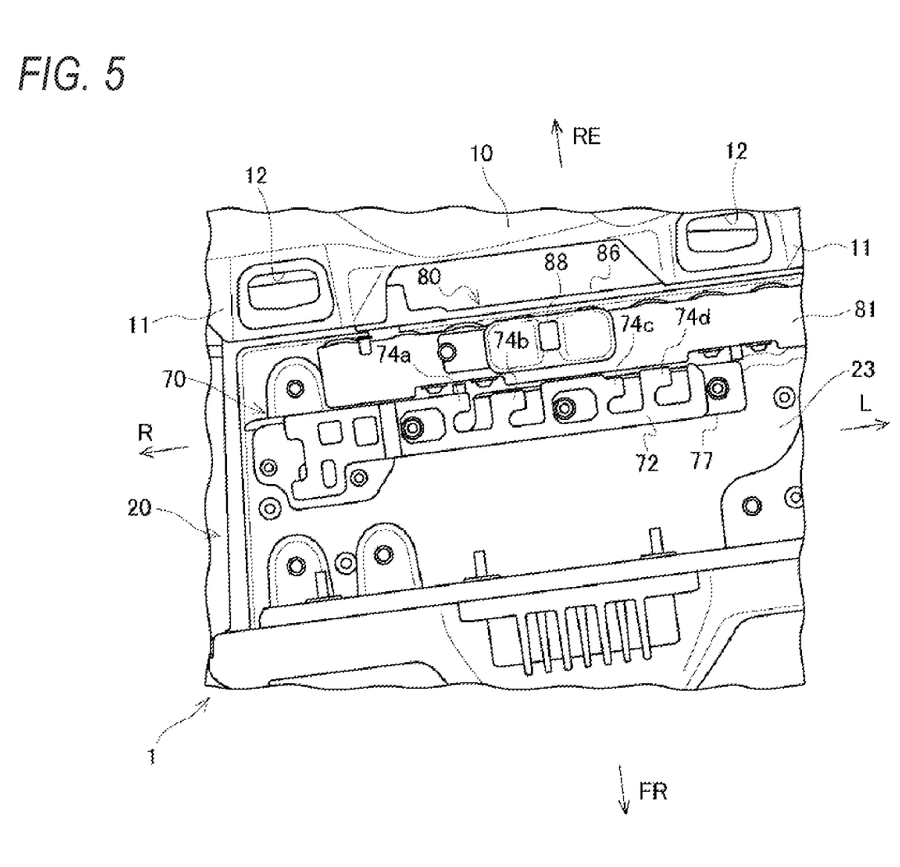
FIG. 5 is a partial plan view of the storage case according to the present embodiment.
Figure 6:
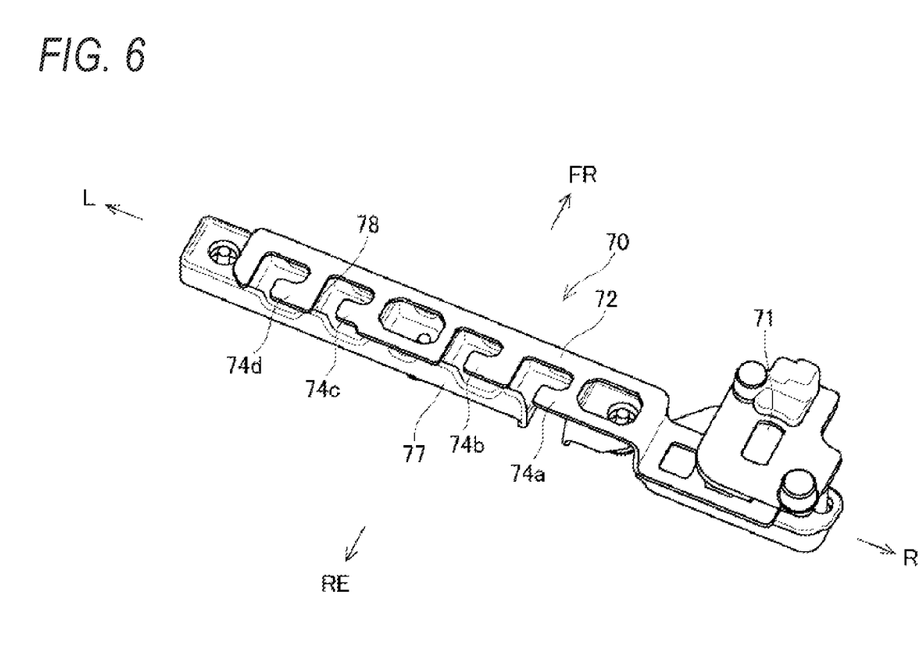
FIG. 6 is a perspective view of a locking mechanism according to the present embodiment.
Figure 7:
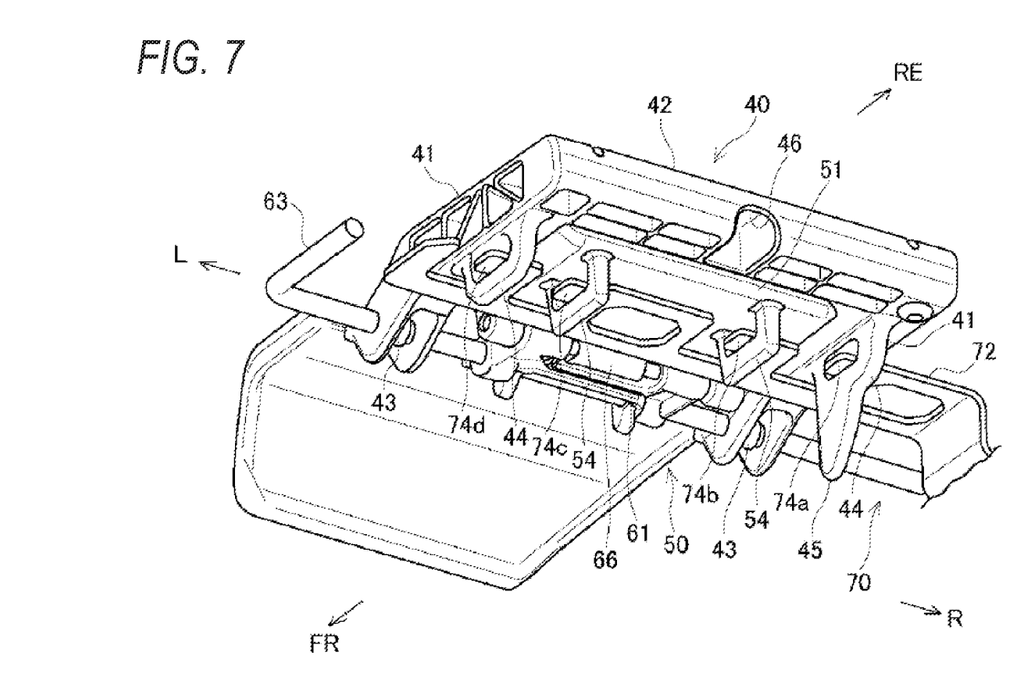
FIG. 7 is a perspective view illustrating a locked state according to the present embodiment.

An upper structure of the storage case will be described with reference to FIGS. 2 to 7. FIG. 2 is a partial cross-sectional view of the storage case according to the present embodiment. FIG. 3 is a plan view of the storage case according to the present embodiment. FIG. 4 is a partial plan view of the storage case according to the present embodiment. FIG. 5 is a partial plan view of the storage case according to the present embodiment. FIG. 6 is a perspective view of the locking mechanism according to the present embodiment. FIG. 7 is a perspective view illustrating a locked state according to the present embodiment. Incidentally, FIG. 4 illustrates a state in which the upper cover, the latch arm, and the handle are removed from the storage case, and FIG. 5 illustrates a state in which an installation cover is further removed.

As illustrated in FIGS. 2 to 4, an upper portion of the case body 20 is formed by an installation cover 22 on which various mechanisms are installed. The upper cover 29 is attached to an upper portion of the installation cover 22 so as to expose the center of an upper surface thereof, and the latch mechanism 50 and the handle 40 are installed on the exposed portion of the installation cover 22 (in particular, see FIG. 3). The latch arm 51 is provided on the upper portion of the installation cover 22 as a hooking fitting of the latch mechanism 50, and an arm receiving portion 35 including a plurality of plate-shaped protrusions are provided on an upper portion of the case cover 30 as receiving fitting of the latch mechanism 50. The latch arm 51 is connected to the installation cover 22 via a connecting arm 61.

The connecting arm 61 is formed in an H shape in a plan view in which a pair of left and right arm portions are included (particularly, see FIG. 4). A base end side of the connecting arm 61 is connected to the installation cover 22 via a first swinging pin 63, and a tip side of the connecting arm 61 is connected to the latch arm 51 via a second swinging pin 64. A cam 62 (particularly, see FIG. 2) is formed on the base end side of the connecting arm 61, and repulsion springs 65 each having an arch shape in a side view that repels the swing of the connecting arm 61 are installed on the installation cover 22. When the connecting arm 61 swings about the first swinging pin 63 and the cam 62 is in elastic contact with the repulsion springs 65, the connecting arm 61 is held in a standing posture in which the latch arm 51 is pushed up and a lying posture in which the latch arm 51 is pulled down.

The latch arm 51 is formed in a wide plate shape extending from the tip side of the connecting arm 61 toward the case cover 30. A cylindrical gripping portion 52 is formed on a base end side of the latch arm 51, and further, the latch arm 51 is lifted by the gripping portion 52. Further, the base end side of the latch arm 51 is pushed in a pushing-up direction (opening direction) by a torsion spring 66 (in particular, see FIG. 4) mounted on the second swinging pin 64. A hook 53 bent in a C shape in the side view is formed on the tip side of the latch arm 51. When the hook 53 is hooked to a tip of the arm receiving portion 35, the case cover 30 is locked to the case body 20 in the closed state.

A recessed portion 31 is formed in the upper portion of the case cover 30 such that the hook 53 of the latch arm 51 enters, and a bottom surface of the recessed portion 31 is formed in a stepped shape having two upper and lower stages. In the upper stage of the recessed portion 31, the arm receiving portion 35 having a comb shape in the plan view are provided in a case width direction (a left-right direction). A locking claw 36 protruding forward from the upper stage of the recessed portion 31 is formed on the tip side of the arm receiving portion 35. An inclined surface 37 (particularly, see FIG. 2) for guiding the hook 53 of the latch arm 51 toward a claw tip of the locking claw 36 is formed on an upper surface of the arm receiving portion 35. When the hook 53 abuts on the inclined surface 37, the hook 53 is guided to a locking position at which the hook 53 is hooked to the locking claw 36.

The inclined surface 37 of the arm receiving portion 35 is formed in a range from a predetermined position on the base end side from the locking claw 36 to the claw tip. In the present embodiment, the inclined surface 37 is formed substantially horizontally from a base end to a substantially intermediate position of the arm receiving portion 35, and is inclined such that the thickness of the arm receiving portion 35 decreases from the substantially intermediate position to the claw tip. The arm receiving portion 35 is formed in an elongated shape in the plan view and facilitates resin molding. The inclined surface 37 may be inclined linearly as in the present embodiment, may be inclined while being curved in a convex shape, or may be inclined while being curved in a concave shape.

The handle 40 is formed in a U shape in the plan view by a pair of support arms 41 that swing about the first swinging pin 63 and a grip 42 that connects the pair of support arms 41. The handle 40 is swingably connected to the same installation cover 22 to which the latch arm 51 is connected, and the base end side of the latch arm 51 is accommodated inside the U-shaped handle 40 in the plan view when the handle 40 is downed. Accordingly, the handle 40 and the latch arm 51 are compactly installed in an installation space on the installation cover 22. Base end sides of the pair of support arms 41 are pushed in a retracting direction (closing direction) by a pair of torsion springs 43 (in particular, see FIG. 4) mounted on the first swinging pin 63.

The first swinging pin 63 extends in the case width direction, and the connecting arm 61 is supported on an inner side in the case width direction of the first swinging pin 63, and the handle 40 is supported on an outer side in the case width direction of the first swinging pin 63. Since the first swinging pin 63 is used for both the connecting arm 61 and the handle 40, the number of components and the cost are reduced, and the latch mechanism 50 and the handle 40 are installed more compactly. Further, one end of the first swinging pin 63 is bent in an L shape, and a tip of the bent portion is restricted from rotating by a holding portion 67 on the installation cover 22. The holding portion 67 suppresses the rotation of the first swinging pin 63 and prevents the handle 40 and the latch arm 51 from rotating together.

As illustrated in FIGS. 5 to 7, the locking mechanism 70 for locking the latch mechanism 50 and the handle 40 simultaneously is provided on a case portion 23 below the installation cover 22. The locking mechanism 70 slides a lock plate 72 connected to the key cylinder 71 in the case width direction (left-right direction) with respect to a plate support portion 77 fixed to the case body 20 (the case portion 23). The plate support portion 77 is formed in a box shape of which an upper surface is open and the case width direction is set as a long side. Convex portions 78 (particularly, see FIG. 6) are formed on a side wall of the plate support portion 77 so as to be in point contact or line contact with the lock plate 72 and suppress a sliding resistance with respect to the lock plate 72.

The lock plate 72 is formed in a strip shape extending in the case width direction. Four locking pieces 74a to 74d that hook the lock plate 72 and the handle 40 are formed on the lock plate 72. The pair of locking pieces 74b, 74c hook the latch arm 51 on the inner side in the case width direction, and the pair of locking pieces 74a, 74d hook the handle 40 on the outer side in the case width direction. A pair of latch receiving portions 54 hooked to the pair of locking pieces 74b, 74c are formed on the latch arm 51, and a pair of handle receiving portions 44 hooked to the pair of locking pieces 74a, 74d are formed on the handle 40.

Openings which the pair of locking pieces 74b, 74c enter are formed in the pair of latch receiving portions 54, and openings which the pair of locking pieces 74a, 74d enter are formed in the pair of handle receiving portions 44. Four slits 24a to 24d (see FIG. 4) are formed in the installation cover 22 so as to correspond to the pair of latch receiving portions 54 and the pair of handle receiving portions 44. The pair of latch receiving portions 54 protrude to the lower side of the installation cover 22 through the slits 24b, 24c on the inner side in the case width direction, and the pair of handle receiving portions 44 protrude to the lower side of the installation cover 22 through the slits 24a, 24d on the outer side in the case width direction.

The lock plate 72 is slid on the plate support portion 77 by an operation of the key inserted into the key cylinder 71 (see FIG. 6). When the lock plate 72 is slid to a left side, the locking pieces 74a to 74d enter the openings of the pair of latch receiving portions 54 and the pair of handle receiving portions 44. Tips of the four locking pieces 74a to 74d pass through the slits 24a to 24d and face an inner side surface of the installation cover 22 (not illustrated). Accordingly, the latch mechanism 50 and the handle 40 are locked. When the lock plate 72 is slid to a right side, the locking pieces 74a to 74d come off the openings of the pair of latch receiving portions 54 and the pair of handle receiving portions 44 to unlock the latch mechanism 50 and the handle 40. A protruding portion 45 for preventing erroneous locking is provided at a lower portion of one handle receiving portion 44 such that the handle 40 does not descend in the locked state.

At this time, since the latch receiving portions 54 and the handle receiving portions 44 are arranged in the case width direction, the latch receiving portions 54 and the handle receiving portions 44 are simultaneously hooked by the single lock plate 72 that is long in the case width direction. When the lock plate 72 is slid in the case width direction, the latch mechanism 50 and the handle 40 are simultaneously locked and unlocked by the lock plate 72. Therefore, the locking mechanism 70 is also used for both the latch mechanism 50 and the handle 40, and the number of components of the locking mechanism 70 is reduced. Further, since the latch receiving portion 54 and the handle receiving portion 44 are close to each other, the lock plate 72 is formed short to improve the durability of the locking mechanism 70.

As described above, the storage case 1 is attached to the vehicle via the case holder 10. A pair of locking portions 11 (in particular, see FIG. 5) protrude from a front surface of the case holder 10, and locking holes 12 are formed in the respective locking portions 11. A pair of fixing hooks 25 (see FIG. 4) protrude from a rear surface of the installation cover 22, and a tip side of each fixing hook 25 is bent downward. Since the tip sides of the pair of fixing hooks 25 of the installation cover 22 enter the pair of locking holes 12 of the case holder 10, the storage case 1 is detachably hooked to the case holder 10 at two places spaced apart from each other in the case width direction. An eaves portion 28 (see FIG. 2) is formed in the storage case 1 and covers a portion to be hooked to the locking portion 11 to improve design.

Further, a fixing mechanism 80 that fixes a hooked state with respect to the case holder 10 is provided on the case portion 23 below the installation cover 22 (see FIG. 4). The fixing mechanism 80 includes a slider 81 stored inside the case body 20 and a slide hook 86 sliding integrally with the slider 81 outside the case body 20. The slider 81 is formed in a prismatic shape having a long side in the case width direction, and is stored so as to be slidable in the case width direction by a wall surface of the case body 20. A knob portion 88 having a convex shape in the side view is provided on an upper surface of the slider 81, and is exposed from an upper surface of the installation cover 22 (see FIG. 4).

The slider 81 is slid by the operation of the knob portion 88, and the slide hook 86 on a rear surface of the case body 20 is slid. When the slider 81 is slid to the left side, the slide hook 86 is spaced apart from the pair of locking portions 11. The hooked state of the storage case 1 is released by the slide hook 86, and the storage case 1 is detachably hooked to the case holder 10. When the slider 81 is slid to the right side, the slide hook 86 abuts on the pair of locking portions 11. The hooked state of the storage case 1 is fixed by the slide hook 86, and the storage case 1 is undetachably hooked to the case holder 10.

In this way, the slider 81 is slid between an attachment/detachment position where the storage case 1 is attachable and detachable and a fixed position where the storage case 1 is not attachable or detachable. A recess 46 for positioning the slider 81 in the fixed position is formed in the grip 42 of the handle 40 (see FIG. 7). In this case, the knob portion 88 is positioned directly below the grip 42 when the handle 40 is downed, and the recess 46 of the grip 42 corresponds to the knob portion 88 when the slider 81 is positioned at the fixed position. When a tip of the knob portion 88 enters the recess 46, the slider 81 is positioned at the fixed position, and the slider 81 is held at the fixed position by the handle 40.

When the slider 81 is not positioned at the fixed position, the knob portion 88 interferes with the grip 42, so that the handle 40 cannot be completely downed. The pair of handle receiving portions 44 enter the slits 24a, 24d (see FIG. 4) of the installation cover 22 halfway, and hinder the sliding of the lock plate 72 of the locking mechanism 70. In this way, the locking mechanism 70 can lock the handle 40 and the latch mechanism 50 only when the slider 81 is positioned at the fixed position. Therefore, the handle 40 and the latch mechanism 50 are not locked in a state in which the storage case 1 is attachable to and detachable from the case holder 10.

On the other hand, when the slider 81 is positioned at the fixed position, the knob portion 88 enters the recess 46 of the handle 40, and the handle 40 is completely downed. Therefore, the sliding of the lock plate 72 of the locking mechanism 70 is not hindered by the pair of handle receiving portions 44. When the latch mechanism 50 and the handle 40 are locked by the locking mechanism 70, the slider 81 is fixed to the fixed position by the handle 40, so that the storage case 1 is not attachable or detachable from the case holder 10. Accordingly, with the locking operation of the latch mechanism 50 and the handle 40, the fixing mechanism 80 is also locked by the handle 40 locked by the locking mechanism 70.

Figure 8A:
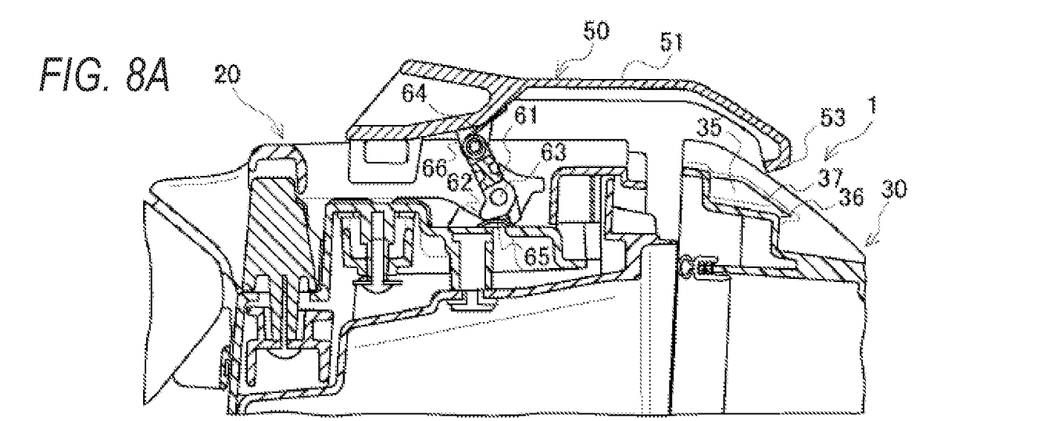
FIGS. 8A to 8C are transition diagrams of a closing operation of a latch mechanism according to the present embodiment.
Figure 8B:
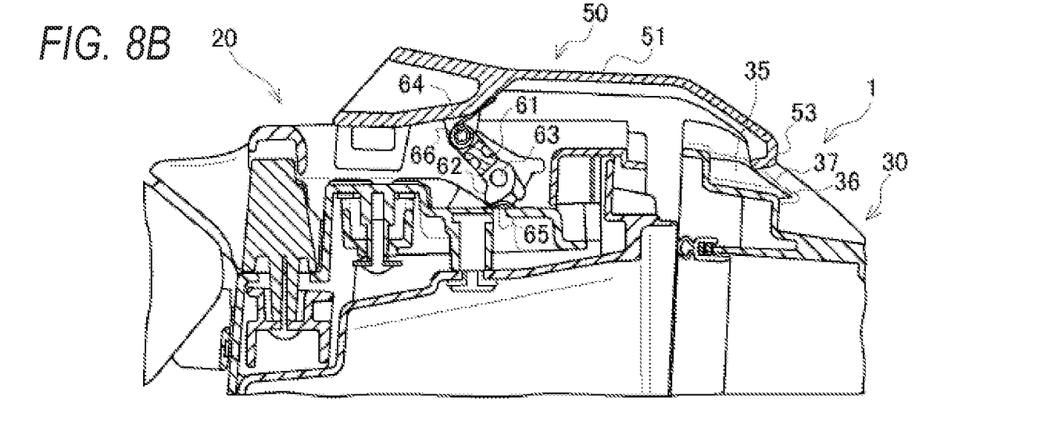
Figure 8C:
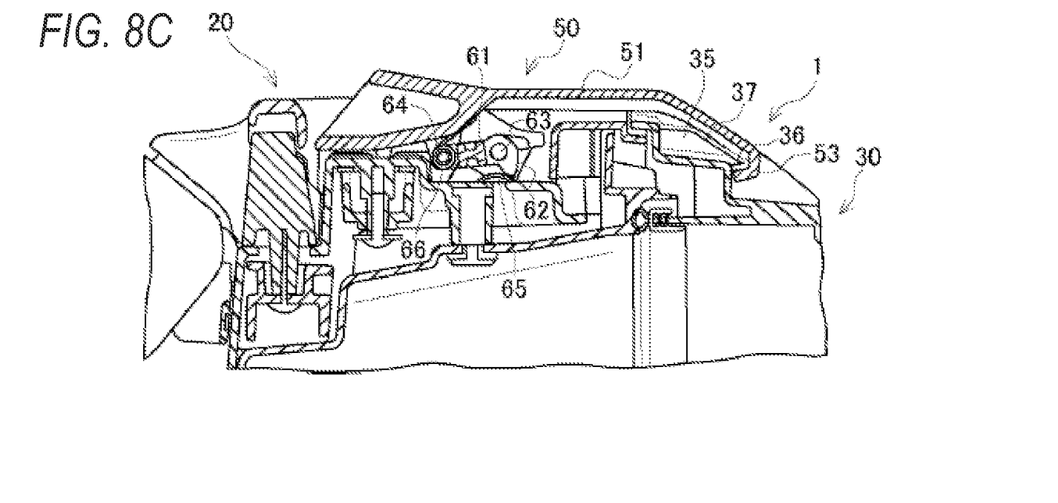
Figure 9A:
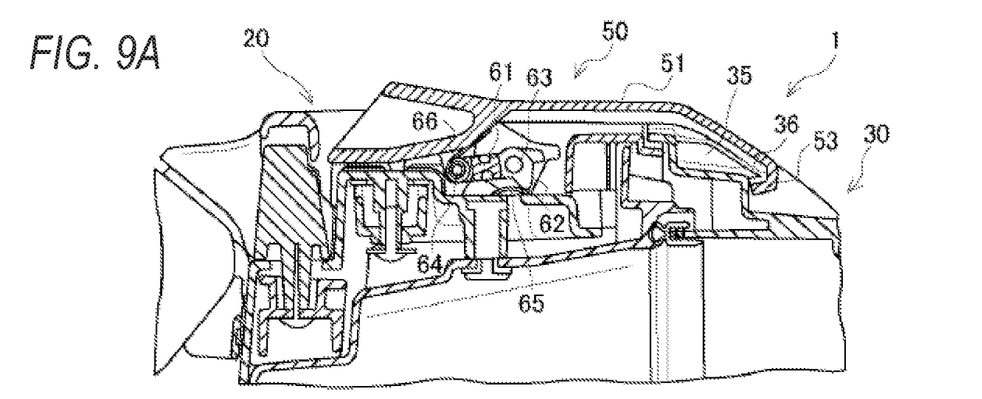
FIGS. 9A to 9C are transition diagrams of an opening operation of the latch mechanism according to the present embodiment.
Figure 9B:
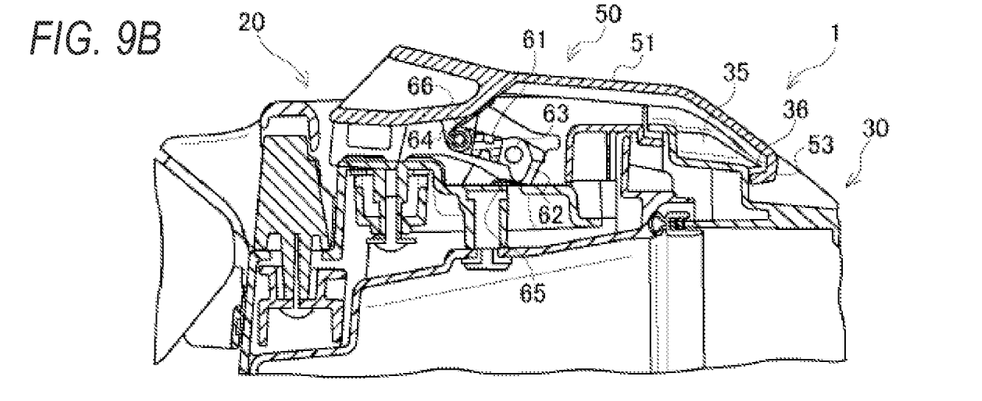
Figure 9C:
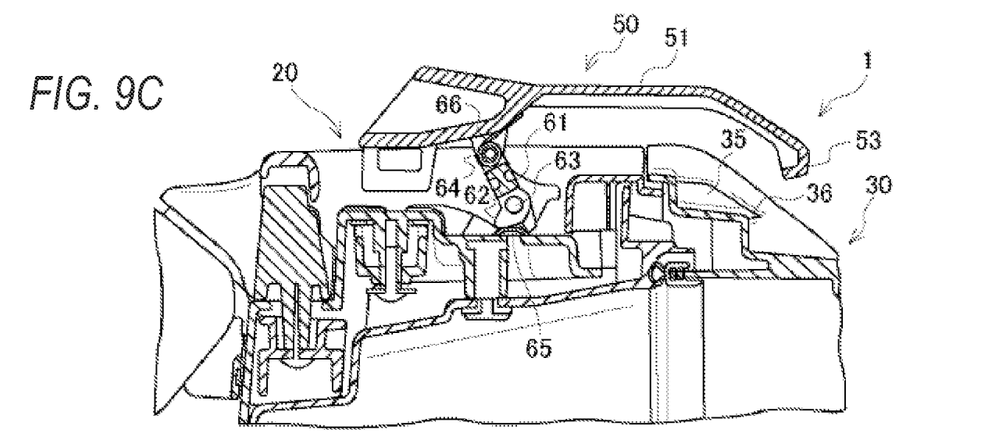

An opening/closing operation of the latch mechanism will be described with reference to FIGS. 8A to 8C and 9A to 9C. FIGS. 8A to 8C are transition diagrams of the closing operation of the latch mechanism according to the present embodiment, where FIG. 8A illustrates an open state of the latch mechanism, FIG. 8B illustrates an operation state of the latch mechanism, and FIG. 8C illustrates a closed state of the latch mechanism. FIGS. 9A to 9C are transition diagrams of the closing operation of the latch mechanism according to the present embodiment, where FIG. 9A illustrates a closed state of the latch mechanism, FIG. 9B illustrates an operation state of the latch mechanism, and FIG. 9C illustrates an open state of the latch mechanism. Incidentally, FIGS. 8A to 8C illustrate a state in which the storage case is slightly opened.

First, the closing operation of the latch mechanism 50 will be described. As illustrated in FIG. 8A, in the open state of the latch mechanism 50, the latch arm 51 is pushed up by the connecting arm 61 in the standing posture. At this time, a spring force of the repulsion springs 65 acts on the cam 62 of the connecting arm 61 clockwise about the first swinging pin 63, and the connecting arm 61 is held in the standing posture by the spring force acted clockwise. Further, a spring force of the torsion spring 66 acts on the latch arm 51 counterclockwise about the second swinging pin 64, and the tip side of the latch arm 51 is lifted by the spring force acted counterclockwise.

As illustrated in FIG. 8B, in a state in which the latch arm 51 is pushed down, the connecting arm 61 is swung counterclockwise about the first swinging pin 63. At this time, the latch arm 51 is pushed down against the spring force of the torsion spring 66, and the connecting arm 61 is swung against the spring force of the repulsion springs 65. Since the storage case 1 is slightly opened, when the cam 62 of the connecting arm 61 rides on the arch-shaped repulsion springs 65, the hook 53 on the tip side of the latch arm 51 abuts on the inclined surface 37 of the arm receiving portion 35. When the hook 53 of the latch arm 51 abuts on the inclined surface 37 of the arm receiving portion 35, the hook 53 is guided toward the claw tip of the locking claw 36 of the arm receiving portion 35.

As illustrated in FIG. 8C, in a state in which the latch arms 51 is further pushed down, the cam 62 of the connecting arm 61 climbs over the repulsion springs 65. At this time, the spring force of the repulsion springs 65 acts on the cam 62 of the connecting arm 61 counterclockwise about the first swinging pin 63, and the latch arm 51 connected to the connecting arm 61 is pulled down. As the latch arm 51 is pulled down, the hook 53 of the latch arm 51 slides on the inclined surface 37 of the arm receiving portion 35, and the case cover 30 is pushed into a case body 20 side by the latch arm 51. When the hook 53 reaches the claw tip of the locking claw 36, the hook 53 is hooked to the locking claw 36 in a state in which the storage case 1 is completely closed.

Next, an opening operation of the latch mechanism 50 will be described. As illustrated in FIG. 9A, in a closed state of the latch mechanism 50, the latch arm 51 is pulled down by the connecting arm 61 in the lying posture. At this time, a spring force of the repulsion springs 65 acts on the cam 62 of the connecting arm 61 counterclockwise about the first swinging pin 63, and the connecting arm 61 is held in the lying posture by the spring force acted counterclockwise. Further, although the spring force of the torsion spring 66 acts on the latch arm 51 counterclockwise about the second swinging pin 64, the hook 53 is hooked to the locking claws 36 such that the latch arm 51 does not come off the arm receiving portions 35.

As illustrated in FIG. 9B, in a state in which the latch arm 51 is lifted, the connecting arm 61 is swung clockwise about the first swinging pin 63. At this time, the connecting arm 61 is swung against the spring force of the repulsion springs 65, and the connecting arm 61 starts to stand from the lying posture. When the cam 62 of the connecting arm 61 climbs on the arch-shaped repulsion springs 65, the base end side of the latch arm 51 connected to the connecting arm 61 is pushed up. In a state in which only the base end side of the latch arm 51 is pushed up, the hook 53 on the tip side of the latch arm 51 is hooked to the locking claw 36 and the closed state of the storage case 1 is maintained.

As illustrated in FIG. 9C, in a state in which the latch arms 51 is further lifted, the cam 62 of the connecting arm 61 climbs over the repulsion springs 65. At this time, the spring force of the repulsion springs 65 acts on the cam 62 of the connecting arm 61 clockwise about the first swinging pin 63, and the latch arm 51 connected to the connecting arm 61 is pushed up. As the latch arm 51 is pushed up, the hook 53 of the latch arm 51 comes off the claw tip of the locking claw 36. The spring force of the torsion spring 66 acts on the base end side of the latch arm 51 counterclockwise about the second swinging pin 64, and the tip side of the latch arm 51 is lifted to release the lock of the latch mechanism 50.

As described above, according to the present embodiment, when the hook 53 abuts on the inclined surface 37 of the arm receiving portion 35 during the lock operation of the latch arm 51, the hook 53 is guided along the inclined surface 37 to the claw tip of the locking claw 36 of the arm receiving portion 35. The hook 53 is hooked to the locking claw 36, and the storage case 1 is locked in a closed state. Since the hook 53 is reliably hooked to the locking claw 36 by an easy operation, it is unnecessary for a user to confirm whether the hook is properly hooked.

Figure 10:
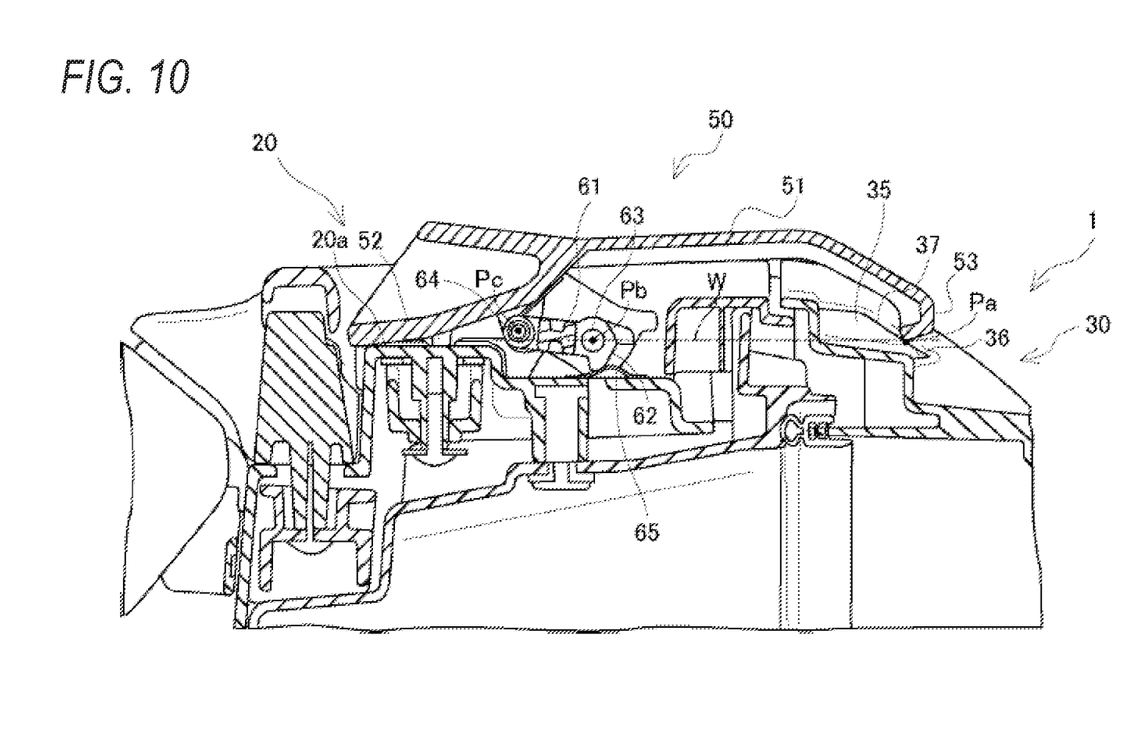
FIG. 10 is a partial cross-sectional view of a storage case according to a modification.

As illustrated in a modification of FIG. 10, in a state in which the hook 53 of the latch arm 51 comes off the claw tip of the locking claw 36, the storage case 1 may be configured such that the latch arm 51 is not completely closed. In FIG. 10, the same names as those in the present embodiment are denoted by the same reference numerals for convenience of description. In a state in which the latch arm 51 is pushed down in the state in which the hook 53 comes off the claw tip of the locking claw 36, the connecting arm 61 is swung counterclockwise about the first swinging pin 63 so as to take the lying posture from the standing posture. In the modification, the latch arm 51 and peripheral components (the locking claw 36, an upper surface 20*a* of the case body 20, the coupling arm 61, and the like) are formed such that the hook 53 of the latch arm 51 abuts on the inclined surface 37 of the arm receiving portion 35 and the gripping portion 52 of the latch arm 51 abuts on the upper surface 20*a* of the case body 20 before the connecting arm 61 swings to the lying posture.

More specifically, the latch arm 51 and the peripheral components are formed such that a center Pc of the second swinging pin 64 is positioned on an open state side (upper side) than a straight line W connecting a point Pa where the hook 53 of the latch arm 51 abuts on the inclined surface 37 of the arm receiving portion 35 and a center Pb of the first swinging pin 63. In other words, in the state in which the hook 53 comes off the claw tip of the locking claw 36 and the connecting arm 61 swings from the standing posture to the lying posture, the latch arm 51 and the peripheral components are formed such that the center Pc of the second swinging pin 64 is located on a side closer to the center Pc of the second swinging pin 64 when the connecting arm 61 takes the standing posture than a straight line W connecting the point Pa where the hook 53 abuts on the inclined surface 37 and the center Pb of the first swinging pin 63. Accordingly, since the connecting arm 61 is slightly inclined without taking the lying posture and the latch arm 51 is not completely closed, the user can easily confirm the state in which the storage case 1 is not properly hooked.

In the modification, when the hook 53 of the latch arm 51 abuts on the inclined surface 37 of the arm receiving portion 35 and the gripping portion 52 of the latch arm 51 abuts on the upper surface 20a of the case body 20, the connecting arm 61 is pushed up to a standing posture side by the repulsive force of the repulsion springs 65. That is, the spring force of the repulsion springs 65 acts on the cam 62 of the connecting arm 61 clockwise around the first swinging pin 63, and the connecting arm 61 is pushed back by the spring force in the clockwise direction. Therefore, in the state in which the hook 53 of the latch arm 51 comes off the claw tip of the locking claw 36, even when the latch arm 51 is to be closed, the latch arm 51 is pushed back in the opening direction so that the user can easily confirm the state in which the storage case 1 is not properly hooked.

Further, in the present embodiment, although the latch arm is connected to the case body via the connecting arm, the latch arm may be directly connected to the case body, or may be connected to the case body via another link mechanism.

Further, in the present embodiment, the single latch arm is hooked to the arm receiving portion including the plurality of plate-shaped protrusions, but the number of the latch arms and the number of the arm receiving portions are not particularly limited. For example, a plurality of the latch arms may be hooked to a plurality of the arm receiving portions, or a single latch arm may be hooked to a single arm receiving portion.

Further, in the present embodiment, the inclined surface is formed in the range from the substantially intermediate position in a longitudinal direction of the arm receiving portion to the claw tip of the locking claw, but the inclined surface may be formed in the range from the predetermined position on the base end side from the locking claw to the claw tip.

Further, in the present embodiment, storage cases are attached to left and right sides of the vehicle, but the storage cases may be attached to front and rear sides of the vehicle. Further, although the case body of the storage case is attached to the case holder, the case cover of the storage case may be attached to the case holder.

As described above, a latch mechanism 50 of a storage case 1 according to the present embodiment is a latch mechanism of a storage case in which a case cover 30 is openably and closably connected to a case body 20, and includes a latch arm 51 connected to the case body and an arm receiving portion 35 provided on the case cover, in which a hook 53 is formed on a tip side of the latch arm, locking claw 36 are formed on a tip side of the arm receiving portion, and an inclined surface 37 is formed on the arm receiving portion to guide the hook toward a claw tip of the locking claw. According to the configuration, when the hook abuts on the inclined surface of the arm receiving portion during a lock operation of the latch arm, the hook is guided along the inclined surface toward the claw tip of the locking claw of the arm receiving portion. The hook is hooked to the locking claw, and the storage case is locked in a closed state. Since the hook is reliably hooked to the locking claw by an easy operation, it is unnecessary for a user to confirm whether the hook is properly hooked.

In the latch mechanism of a storage case according to the present embodiment, the inclined surface is formed on the arm receiving portion in a range from a predetermined position on a base end side from the locking claw to the claw tip. According to this configuration, even if the hook abuts on the base end side of the locking claw of the arm receiving portion, the hook is guided along the inclined surface to the claw tip of the locking claw, and the hook is properly hooked to the locking claw.

The latch mechanism of a storage case according to the present embodiment further includes a connecting arm 61 connected to the case body, and a repulsion spring 65 repels a swing of the connecting arm, in which the latch arm is connected to the connecting arm, the connecting arm configured to take a standing posture in which the latch arm is pushed up and a lying posture in which the latch arm is pulled down, the connecting arm is held in the standing posture by a repulsive force of the repulsion spring in an open state of the latch mechanism, and the connecting arm is held in the lying posture by the repulsive force of the repulsion spring in a closed state of the latch mechanism. According to this configuration, by holding the connecting arm in the standing posture in the open state of the latch mechanism, the latch arm can be lifted by the connecting arm to maintain an unlocked state in which the hook comes off the locking claw. By holding the connecting arm in the lying posture in the closed state of the latch mechanism, the latch arm can be pulled down by the connecting arm to maintain a locked state in which the hook comes off the locking claw.

In the latch mechanism of the storage case according to the present embodiment, a gripping portion 52 is formed on a base end side of the latch arm, and in a state in which the hook comes off the claw tip of the locking claw, and the connecting arm swings from the standing posture to the lying posture, the hook abuts on the inclined surface and the gripping portion abuts on an upper surface of the case body. According to the configuration, since the latch arm is not completely closed in the state in which the hook of the latch arm comes off the claw tip of the locking claw, the user can easily confirm the state in which the storage case is not properly hooked.

In the latch mechanism of the storage case according to the present embodiment, the connecting arm is connected to the case body via a first swinging pin 63, the latch arm is connected to the connecting arm via a second swinging pin 64, in the state in which the hook comes off the claw tip of the locking claw and the connecting arm swings from the standing posture to the lying posture, and a center Pc of the second swinging pin is located on a side closer to the center of the second swinging pin when the connecting arm takes the standing posture than a straight line W connecting a point Pa where the hook abuts on the inclined surface and a center Pb of the first swinging pin. According to this configuration, since the connecting arm is inclined without taking the lying posture and the latch arm is not completely closed, the user can easily confirm the state in which the storage case is not properly hooked.

In the latch mechanism of the storage case according to the present embodiment, in a state in which the hook abuts on the inclined surface and the gripping portion abuts on the upper surface of the case body, the connecting arm is pushed up to a standing posture side by the repulsive force of the repulsion spring. According to the configuration, in the state in which the hook of the latch arm comes off the claw tip of the locking claw, even when the latch arm is to be closed, since the latch arm is pushed back in the opening direction, the user can easily confirm the state in which the storage case is not properly hooked.

Although the present embodiment has been described, the above-described embodiment and the modification may be combined in whole or in part as another embodiment.

The technique of the present invention is not limited to the above-described embodiment, and various changes, substitutions, and modifications may be made without departing from the spirit of the technical idea of the present invention. Further, the present invention may be implemented using other methods as long as the technical concepts can be implemented by the methods through advance of the technology or other derivative technology. Accordingly, the claims cover all embodiments that may be included within the scope of the technical concepts.

What is claimed is:

1. A latch mechanism of a storage case in which a case cover is openably and closably connected to a case body, the latch mechanism comprising:
    a latch arm connected to the case body; and
    an arm receiving portion provided on the case cover,
    wherein a hook is formed on a tip side of the latch arm,
    wherein a locking claw is formed on a tip side of the arm receiving portion,
    wherein the arm receiving portion is formed with an inclined surface that guides the hook toward a claw tip of the locking claw,
    wherein the latch mechanism includes:
        a connecting arm connected to the case body; and
        a repulsion spring configured to repel a swing of the connecting arm,
    wherein the latch arm is connected to the connecting arm,
    wherein the connecting arm is configured to take a standing posture in which the latch arm is pushed in a first direction and a lying posture in which the latch arm is pulled in a second direction opposite the first direction,
    wherein in an open state of the latch mechanism, the connecting arm is held in the standing posture by a repulsive force of the repulsion spring, and in a closed state of the latch mechanism, the connecting arm is held in the lying posture by the repulsive force of the repulsion spring,
    wherein the connecting arm is connected to the case body via a first swing pin at one end of the connecting arm, and is connected to the latch arm via a second swing pin at the other end of the connecting arm,
    wherein a cam protruding from the connecting arm is formed at the one end of the connecting arm,
    wherein the repulsion spring is disposed facing the cam in the case body, and is configured to exert a force in the direction of pushing the cam and is configured to exert the repulsive force in a direction of pushing the cam,
    wherein in an axial view of the first swing pin, in the standing posture of the connecting arm, the cam is disposed biased to one side with respect to the first swing pin and is configured to be attached in a direction in which the connecting arm stands by receiving the repulsive force of the repulsive spring, and
    wherein in the axial view of the first swing pin, in the lying posture of the connecting arm, the cam is disposed biased to the other side with respect to the first swing pin and is configured to be attached in a direction in which the connecting arm lies by receiving the repulsive force of the repulsive spring.

2. The latch mechanism of a storage case according to claim 1,
    wherein the inclined surface is formed on the arm receiving portion in a range from a position on a base end side from the locking claw to the claw tip.

3. The latch mechanism of a storage case according to claim 1,
    wherein a gripping portion is formed on a base end side of the latch arm, and
    wherein in a state in which the hook comes off the claw tip of the locking claw and the connecting arm swings from the standing posture to the lying posture, the hook abuts on the inclined surface and the gripping portion abuts on an upper surface of the case body.

4. The latch mechanism of a storage case according to claim 3,
    wherein in the state in which the hook comes off the claw tip of the locking claw and the connecting arm swings from the standing posture to the lying posture, a center of the second swinging pin is located on a side closer to the center of the second swinging pin when the connecting arm takes the standing posture than a straight line connecting a point where the hook abuts on the inclined surface and a center of the first swinging pin.

5. The latch mechanism of a storage case according to claim 3,
    wherein in a state in which the hook abuts on the inclined surface and the gripping portion abuts on the upper surface of the case body, the connecting arm is pushed up to a standing posture side by the repulsive force of the repulsion spring.

6. A latch mechanism of a storage case in which a case cover is openably and closably connected to a case body, the latch mechanism comprising:
    a latch arm connected to the case body; and
    an arm receiving portion provided on the case cover,
    wherein a hook is formed on a tip side of the latch arm,
    wherein a locking claw is formed on a tip side of the arm receiving portion,
    wherein the arm receiving portion is formed with an inclined surface that guides the hook toward a claw tip of the locking claw,
    wherein the latch mechanism includes:
        a connecting arm connected to the case body; and
        a repulsion spring configured to repel a swing of the connecting arm,
    wherein the latch arm is connected to the connecting arm,
    wherein the connecting arm is configured to take a standing posture in which the latch arm is pushed in a first direction and a lying posture in which the latch arm is pulled in a second direction opposite the first direction,
    wherein in an open state of the latch mechanism, the connecting arm is held in the standing posture by a repulsive force of the repulsion spring, and in a closed state of the latch mechanism, the connecting arm is held in the lying posture by the repulsive force of the repulsion spring, and
    wherein in an axial view of a first swing pin, in a state in which the hook comes off the claw tip of the locking claw and the connecting arm swings from the standing posture to the lying posture, a cam is disposed biased to the one side with respect to the first swing pin and is configured to be attached in the direction in which the connecting arm stands by receiving the repulsive force of the repulsive spring.

* * * * *